Nov. 10, 1931.  R. J. STOKES  1,831,724
ARMORED HOSE
Filed Nov. 7, 1929
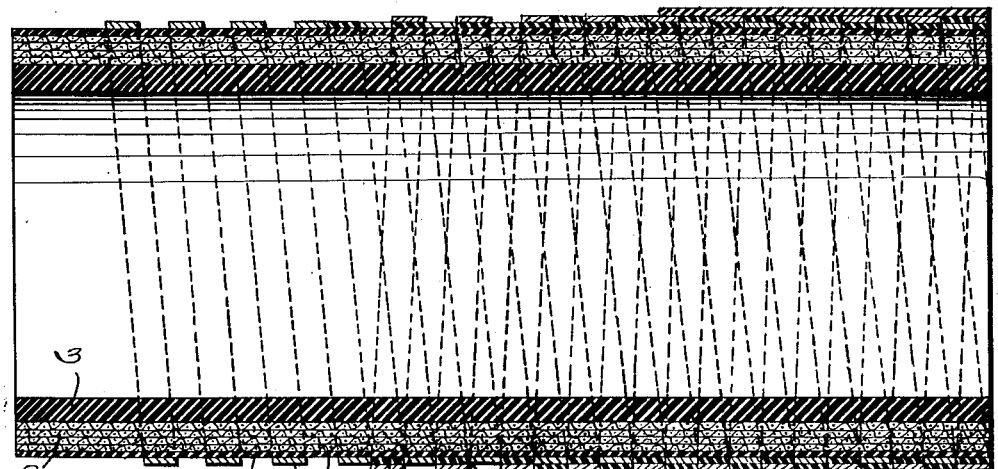
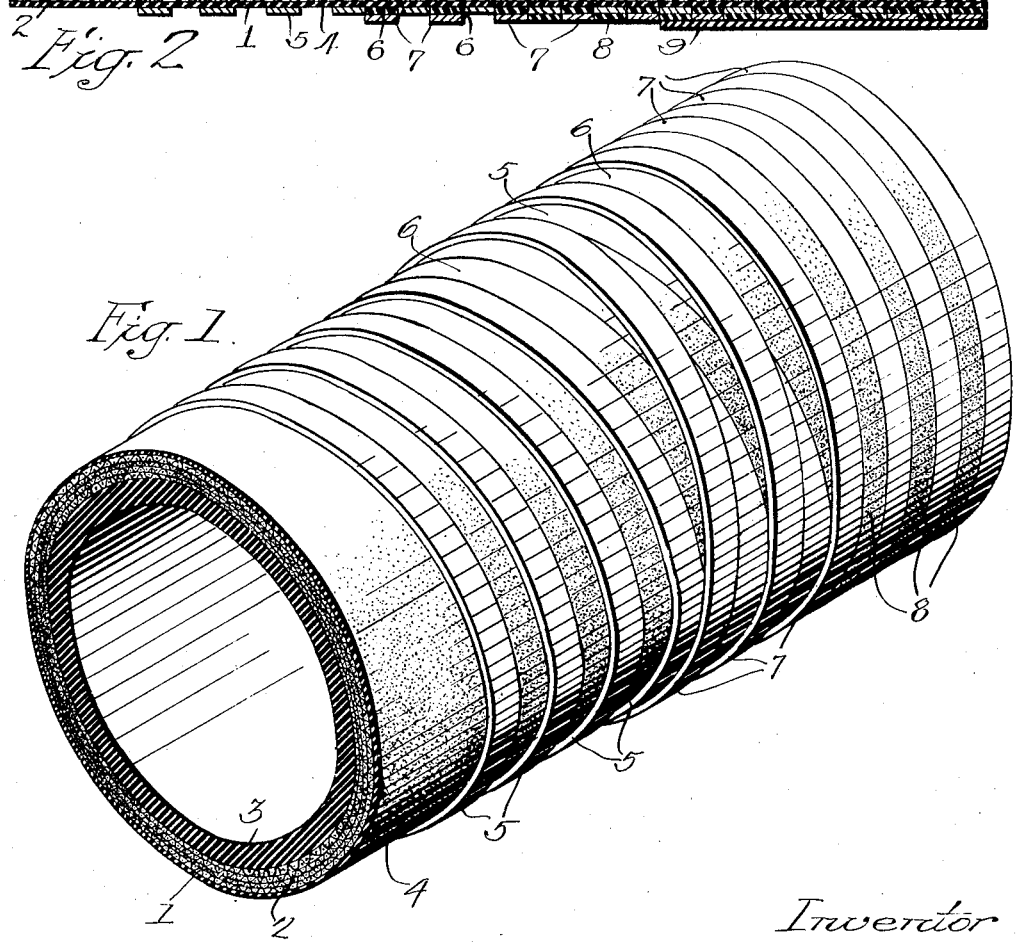
Inventor
Robert J. Stokes
by his Attorneys
Howson & Howson Patented Nov. 10, 1931

1,831,724

UNITED STATES PATENT OFFICE

ROBERT J. STOKES, OF PRINCETON TOWNSHIP, MERCER COUNTY, NEW JERSEY, ASSIGNOR TO THERMOID RUBBER COMPANY, OF TRENTON, NEW JERSEY, A CORPORATION OF NEW JERSEY

ARMORED HOSE

Application filed November 7, 1929. Serial No. 405,415.

This invention relates to improvements in armored hose and particularly to that class of hose used in high pressure operations.

One object of the invention is to simplify the production of armored hose of this class.

Another object of the invention is to provide a hose which, while strong and durable will have a relatively high flexibility.

In the attached drawings:

Figure 1 is a view in perspective of a fragment of a hose made in accordance with my invention, the view being such as to illustrate the successive steps of manufacture; and Fig. 2 is a longitudinal sectional view through the section of hose shown in Fig. 1.

With reference to the drawings:

My hose comprises the usual rubber or rubberized tubular base 1, this consisting, in the present instance, of a rubberized fabric tube 2, having an inner facing or sheath 3 of rubber and an outer rubber sheath 4.

In accordance with my invention, I wind directly upon the surface of the outer sheath 4, in the form of a continuous open helix, a flat wire 5 of substantial rectangular cross-section. The convolutions of this wire are spaced apart to an extent corresponding substantially with the width of the wire itself.

I now wind upon the sheath 4 of the hose, within the spaces between the convolutions of the wire 5, a strip 6 of uncured rubber, this strip being cross-sectionally, substantially of the same dimensions as the wire 5 and thereby neatly filling the space between the adjacent convolutions of the latter.

I then subject the strip 6 to a vulcanizing operation which renders this strip strong and resilient and thoroughly bonds this strip with the outer sheath 4.

I now wind around the layer formed by the wire 5 and the rubber strip 6, a second helix of wire 7, this wire being wound in a direction opposite to the helix of the wire 5. The dimensions of the wire 7 and the spacing of the successive convolutions thereof, one substantially the same as those of the wire 5. Within the spaces between the convolutions of the wire 7, I now lay a second helical strip 8 of rubber, this rubber being in an uncured state and neatly filling the spaces between the wire convolutions. A second vulcanizing operation follows, which cures this rubber and creates a secure bond between this strip and the rubber of the strip 6. Subsequently an outer sheath of rubber may be applied if desired as indicated at 9 in Fig. 2. The aforedescribed procedure may be varied by applying the rubber strips in the open helix formation prior to the application of the interspersed wires.

An armored hose made in accordance with the above procedure has been found to possess great strength and durability and also a relatively high flexibility, it being apparent that during flexure, a compression of the rubber intermediate the convolutions of the wires permits entire freedom of relative movement. At the same time no unfilled spaces are left between the wires for admission of air or moisture or of the substances having a deteriorating effect either upon the rubber or the wire.

I claim:

1. A hose comprising a flexible rubber tube, a wire wound about said tube in spaced convolutions, rubber filling the spaces between said convolutions and bonded to the rubber tube, a second helix of wire wound in an opposite direction about the first, whereby the latter constitutes a seat for the former, and a rubber filling between the convolutions of the outer wire bonded to the rubber underlying.

2. An armored rubber hose comprising superimposed and contacting opposite helices of metallic wire, the convolutions of said helices being spaced, and vulcanized rubber filling the spaces between said convolutions.

3. A hose comprising a flexible rubber tube, a metallic wire of rectangular cross section wound about the tube in spaced convolutions, a flat side of said wire seating upon the outer surface of the tube, rubber filling the spaces between said convolutions and bonded to the said tube, a second helix of wire also of rectangular cross section wound in an opposite direction about the first, said second wire seating upon the first and having metal-to-metal contact therewith, and a rubber filling between the convolutions of the outer wire bonded to the rubber underlying.

ROBERT J. STOKES.